(12) United States Patent
Brown et al.

(10) Patent No.: US 8,484,363 B2
(45) Date of Patent: Jul. 9, 2013

(54) DEVICE PROVISIONING OR PAIRING USING GRAPHICAL REPRESENTATION OF DEVICE IDENTIFIER

(75) Inventors: Bill Brown, Redwood City, CA (US); James Hunter, San Jose, CA (US); Andy Mutz, Palo Alto, CA (US)

(73) Assignee: Motorola Mobility LLC, Libertyville, IL (US)

( * ) Notice: Subject to any disclaimer, the term of this patent is extended or adjusted under 35 U.S.C. 154(b) by 152 days.

(21) Appl. No.: 13/278,429

(22) Filed: Oct. 21, 2011

(65) Prior Publication Data

US 2013/0103847 A1  Apr. 25, 2013

(51) Int. Cl.
*G06F 15/16* (2006.01)
*G06F 15/00* (2006.01)
*G06F 15/02* (2006.01)

(52) U.S. Cl.
USPC ........... 709/229; 709/203; 709/231; 709/200; 709/212; 709/217; 709/218; 709/219; 709/225; 709/220; 709/224

(58) Field of Classification Search
USPC ......... 709/200, 203, 231, 229, 212, 217–219, 709/225, 224, 249
See application file for complete search history.

(56) References Cited

U.S. PATENT DOCUMENTS

| 8,266,241 | B1* | 9/2012 | Neubrand et al. | 709/217 |
|---|---|---|---|---|
| 2004/0001226 | A1* | 1/2004 | Ohtuka | 358/1.15 |
| 2007/0192408 | A1* | 8/2007 | Konig | 709/203 |
| 2009/0083834 | A1 | 3/2009 | Rubinstein et al. | |
| 2010/0080383 | A1 | 4/2010 | Vaughan et al. | |
| 2011/0219427 | A1 | 9/2011 | Hito et al. | |
| 2012/0274962 | A1* | 11/2012 | Thomas et al. | 358/1.12 |

* cited by examiner

*Primary Examiner* — Jude Jean Gilles

(57) ABSTRACT

Provisioning a local device with an account associated with a client device or pairing an accessory device with a local device is disclosed. A client device captures a graphical representation of a local device identifier using an image capture device, identifies the local device identifier and transmits the local device identifier to a remote server. The remote server determines an account associated with the client device and associates the local device identifier with the account. An accessory device includes a graphical representation of an accessory device identifier that is captured by an image capture device of the client device. An accessory device identifier is identified and transmitted to the remote server or to the local device, which associates the accessory device identifier with a local device identifier.

21 Claims, 6 Drawing Sheets

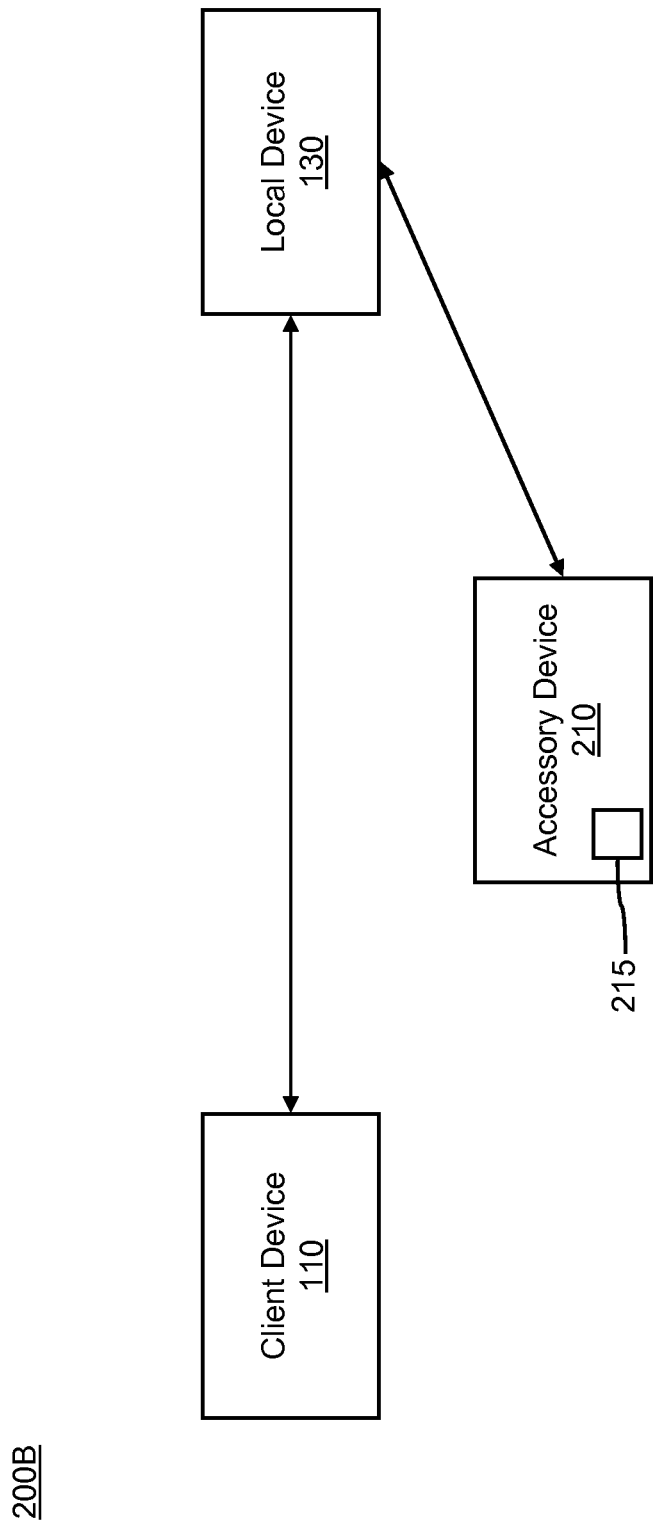

DEVICE PROVISIONING OR PAIRING USING GRAPHICAL REPRESENTATION OF DEVICE IDENTIFIER

FIELD OF THE DISCLOSURE

The present disclosure relates generally to managing communication between devices, and more specifically to pairing devices or provisioning one or more devices with an account.

BACKGROUND

Increasingly, users share data between various computing devices or use various computing devices to access an account and/or data associated with the account. A computing device is provisioned with an account to allow the computing device to access the account. In conventional provisioning methods, a device identifier associated with a computing device is associated with an account to indicate the computing device is permitted to access the account. However, conventional provisioning methods frequently require a user to manually enter device identifiers associated with different computing devices, increasing the likelihood of an error in a device identifier. Manual entry of device identifiers for multiple devices is also time consuming, making it cumbersome for a user to provision multiple computing devices with an account.

Similarly, computing devices may also be paired to exchange data with each other. Typically, paring identifies an accessory device to a main device to facilitate exchange of data between the accessory device and the main device. For example, the main device stores an accessory device identifier to pair the accessory device with the main device. However, conventional device pairing methods frequently require manual entry of the accessory device identifier to the main device. This increases the likelihood of an error in the accessory device identifier and also becomes time consuming when pairing several accessory devices with a main device.

BRIEF DESCRIPTION OF THE DRAWINGS

The accompanying Figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2B is a block diagram of a computing system in accordance with additional embodiments.

Figure 1:
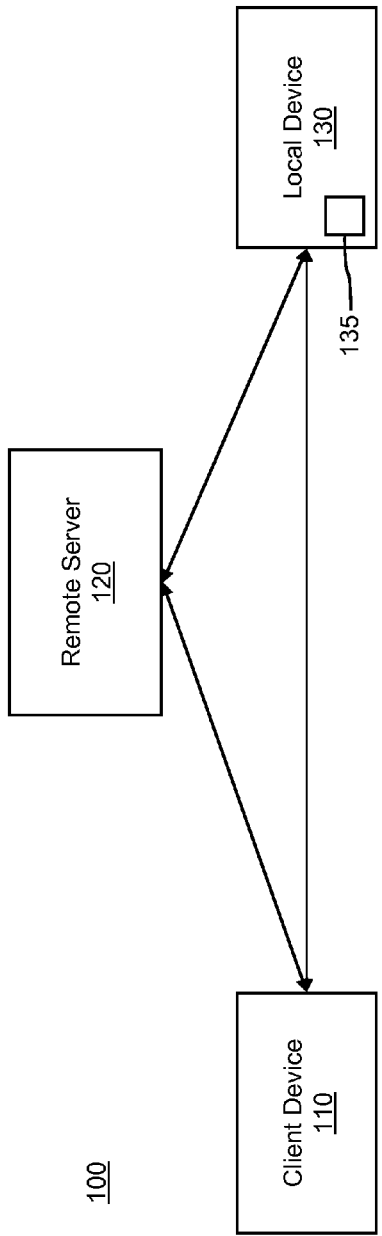
FIG. 1 is a block diagram of a computing system in accordance with some embodiments.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

The following disclosure describes a system and method for provisioning a local device with an account or for pairing an accessory device with a local device. In one embodiment a local device identifier is associated with a local device and includes a graphical representation of the local device identifier that is an image generated by encoding the local device identifier and a remote server address. A client device includes an image capture device configured to capture the graphical representation of the local device identifier. The client device is also associated with an account and determines the local device identifier and the remote server address from the captured graphical representation of the local device identifier. The client device generates a message including the local device identifier. In one embodiment, the message also includes additional data for provisioning the local device, such as a type associated with the local device, metadata describing the local device or other attributes of the local device. A remote server associated with the remote server address includes data describing the account associated with the client device and is coupled to the client device and to the local device. The remote server receives the message from the client device and to associate the local device identifier from the message with the account.

In another embodiment, a local device is associated with a local device identifier and an accessory device is associated with an accessory device identifier. The accessory device also includes a graphical representation of the accessory device identifier comprising an image generated by encoding the accessory device identifier and a remote server address. A client device associated with an account includes an image capture device configured to capture the graphical representation of the accessory device identifier from the accessory device. The client device determines the accessory device identifier from the graphical representation of the accessory device identifier and generates a message including the accessory device identifier. In one embodiment, the message also includes additional data describing the accessory device, such as a type associated with the accessory device, metadata describing the accessory device or other attributes of the accessory device. A remote server associated with the remote server address is coupled to the client device and to the local device and includes data describing the account associated with the client device. The remote server receives the message from the client device, associates the accessory device identifier with the account and transmits to the local device an instruction to accept a pairing request including the accessory device identifier.

In an alternative embodiment, an accessory device is associated with an accessory device identifier and includes a graphical representation of the accessory device identifier comprising an image generated by encoding the accessory device identifier and a remote server address. A client device associated with an account includes an image capture device configured to capture the graphical representation of the accessory device identified from the accessory device. The client device determines the accessory device identifier from the graphical representation of the accessory device identifier and generates a message including the accessory device identifier. A local device is associated with a local device identifier and is coupled to the client device. The local device receives the message from the client device and stores the accessory device identifier included in the message.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

FIG. 1 is a block diagram of one embodiment of a computing system 100. In the embodiment shown by FIG. 1, the computing system 100 includes a client device 110, a remote server 120 and a local device 130. However, in different embodiments, the computing system 100 may include different and/or additional components than those depicted in FIG. 1.

The client device 110 is any device with data processing and data communication capabilities. Examples of a client device 110 include a smartphone, a tablet computer, a netbook computer, a laptop computer or any other suitable device. The client device 110 includes an image capture device including optics and sensors for capturing image data. Additionally, the client device 110 is communicatively coupled to the remote server 120 through a network connection or through a direct connection. Additionally, the client device 110 is associated with an account, such as a user's account. In one embodiment, the client device 110 includes data identifying the account. For example, the client device 110 stores an account identifier or other data identifying the account. The client device 110 is further described below in conjunction with FIG. 3.

The remote server 120 is one or more computing devices having data processing and data communication capabilities. The remote server 120 is communicatively coupled to and exchanges data with the client device 110. In one embodiment, the remote server 120 and the client device 110 are communicatively coupled via a network. Alternatively, the remote server 120 is directly connected to the client device 110. In one embodiment, the remote server 120 stores data associated with an account and may include data associating the account with the client device 110. For example, the remote server 120 includes a database associating an account with a client device identifier associated with the client device 110. In one embodiment, the remote server 120 receives data, such as representational state transfer (REST) data, from the client device 110 and processes the received data. The remote server 120 may also transmit data to a local device 130 and/or process data received from a local device 130.

The local device 130 is a device having data processing and data communication capabilities. Examples of the local device 130 include a server, a controller, a gateway, a display, a renderer, a bridge or any other suitable device. A local device identifier is associated with the local device 130 and uniquely identifies the local device 130. In one embodiment, a client device 110 or the remote server 120 uses the local device identifier when communicating with the local device 130. For example, the local device identifier is an alphanumeric string. In one embodiment, the local device 130 stores the local device identifier in a memory or other storage device.

A graphical representation of the local device identifier 135 is also included by the local device 130. In one embodiment, the graphical representation of the local device identifier 135 is a two-dimensional image generated by applying an encoding process to the local device identifier and a remote server address. The graphical representation of the local device identifier 135 may include additional information for provisioning the local device 130, such as a type associated with the local device 130, metadata describing one or more attributes of the local device 130, commands for provisioning the local device 130 or any other data associated with the local device 130 or for provisioning the local device 130. For example, the graphical representation of the local device identifier 135 is a quick response (QR) code or any other suitable image generated from the local device identifier and the remote server address. As another example, data included in the graphical representation of the local device identifier 135 may be captured via near field communication (NFC). Hence, the graphical representation of the local device identifier 135 includes sufficient data to enable provisioning of the local device 130 with an account using data extracted from the graphical representation of the local device identifier 135. In one embodiment, the graphical representation of the local device identifier 135 is displayed on, or affixed to, a surface of the local device 130. In another embodiment, the graphical representation of the local device identifier 135 is packaged with the local device 130. Alternatively, the graphical representation of the local device identifier 135 is displayed using a display device of the local device 130.

Figure 2A:
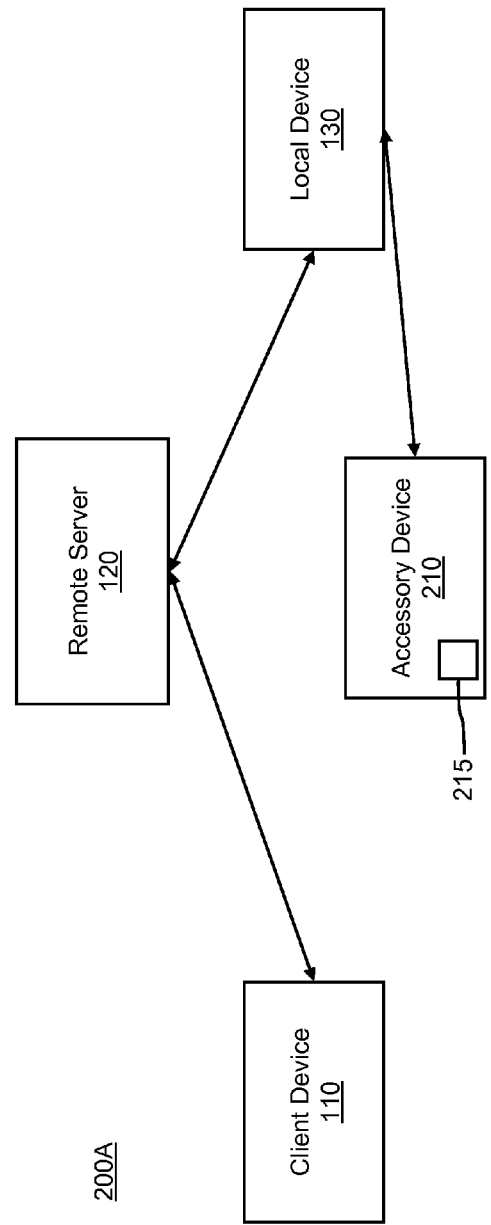
FIG. 2A is a block diagram of a computing system in accordance with alternative embodiments.

FIG. 2A is a block diagram of an alternative embodiment of a computing system 200A. The computing system 200A shown by FIG. 2A includes a client device 110, a remote server 120, a local device 130 and an accessory device 210. The client device 110, remote server 120 and local device 130 are described above in conjunction with FIG. 1. In different embodiments, the computing system 200A may include different and/or additional components than those depicted in FIG. 2A.

In the computing system 200A illustrated by FIG. 2A, the remote server 120 includes data describing an account associated with the client device 110 and associating the client device 110 with the account. The remote server 120 also receives data, such as representational state transfer (REST) data, from the client device 110 and processes the received data. In one embodiment, the remote server 120 also receives and processes data from the local device 130. In the embodiment of FIG. 2A, the remote server 120 also includes data associating the local device 130 with the account. For example, the remote server 120 stores an association between a local device identifier and the account.

In the computing system 200A, the client device 110 is communicatively coupled to the remote server 120 and to the accessory device 210. For example, the client device 110 exchanges data with the remote server and/or the accessory device 210 through a network. As another example, the client device 110 exchanges data with the remote server 120 via a direct connection and/or exchanges data with the accessory device 210 via a direct connection with the accessory device 210.

Additionally, the local device 130 is communicatively coupled to the remote server 120. For example, the local device 130 exchanges data with the remote server 120 through a network. As another example, the local device 130 exchanges data with the remote server 120 via a direct connection.

The accessory device 210 is a device having data processing and data communication capabilities. The accessory device 210 exchanges data with the local device 130. For example, the accessory device 210 retrieves data from the local device 130 and presents the retrieved data to a user. As another example, the accessory device 210 transmits data and/or instructions to the local device 130 for storage or to cause an action by the local device 130.

An accessory device identifier is associated with the accessory device 210 to uniquely identify and/or access the accessory device 210. In one embodiment, the accessory device 210 stores the local device identifier in a memory or other storage device associated with the accessory device 210. For example, the accessory device identifier is an alphanumeric string. A graphical representation of the accessory device identifier 215 is also displayed by the accessory device 210. In one embodiment, the graphical representation of the accessory device identifier is a two-dimensional image generated by applying an encoding process to the accessory device identifier and a remote server address. The graphical representation of the accessory device identifier 215 may include additional information for pairing the local device 130 and the accessory device 210, such as a type associated with the accessory device 210, metadata describing one or more attributes of the accessory device 210, commands for pairing the local device 130 and the accessory device 130 or any other data associated with the accessory device 210 or for paring the accessory device 210 and the local device 130. For example, the graphical representation of the accessory device identifier 215 is a quick response (QR) code or any other suitable image generated from the local device identifier. Hence, the graphical representation of the accessory device identifier 215 includes sufficient data to enable pairing of the local device 130 with the accessory device 210 an account using data extracted from the graphical representation of the accessory device identifier 215. As another example, data included in the graphical representation of the accessory device identifier 210 may be captured via near field communication (NFC). In one embodiment, the graphical representation of the accessory device identifier 215 is displayed on, or affixed to, a surface of the accessory device 210. In another embodiment, the graphical representation of the accessory device identifier 215 is packaged with the accessory device 210. Alternatively, the graphical representation of the accessory device identifier 215 is displayed by a display device of the accessory device 210.

FIG. 2B is a block diagram of another embodiment of a computing system 200B. In the embodiment shown by FIG. 2B, the computing system 200B includes a client device 110, a local device 130 and an accessory device 210. The computing system 200B is an example system for locally pairing of the accessory device 210 with the local device 130. The client device 110, the remote server 120, the local device 130 and the accessory device 210 are further described above in conjunction with FIGS. 1 and 2A. Furthermore, in different embodiments, the computing system 200B may include different and/or additional components than those depicted in FIG. 2B.

In the computing system 200B, the client device 110 is communicatively coupled to the local device 130. Similarly, the local device 130 is communicatively coupled to the client device 110 and to the accessory device 210. In one embodiment, the communicative coupling between two or more of the components is implemented via one or more networks. Alternatively, the communicative coupling between two or more of the components is implemented by a direct connection between two devices. Additionally, the communicative coupling between different components may be implemented by a combination of a network and one or more direct connections between components.

In embodiments of the above-described computing systems 100, 200A, 200B where one or more networks communicatively couple two or more devices, a network is a conventional type for data, video and/or audio transmission. In various embodiments, a network is a wired network, a wireless network or a combination of wireless and wired networks. The network may have any number of configurations such as a star configuration, a token ring configuration or another configuration known in the art. Furthermore, the network may comprise a local area network (LAN), a wide area network (WAN) (e.g., the Internet), and/or any other interconnected data path across which multiple devices may communicate. In yet another embodiment, the network may be a peer-to-peer network. The network may also be coupled to or include portions of a telecommunications network for sending data in a variety of different communication protocols, such as those used for TCP/IP, satellite link and/or cable television communication. For example, the network may transmit voice data using one or more of a Global System for Mobile (GSM) communication system, Code Division Multiple Access (CDMA) system, Universal Mobile Telecommunications System (UMTS) or any other suitable protocols.

A network may also transmit data using one or more of General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax) or any other suitable protocol. In yet another embodiment, the network 140 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email or other types of data known in the art.

Figure 3:
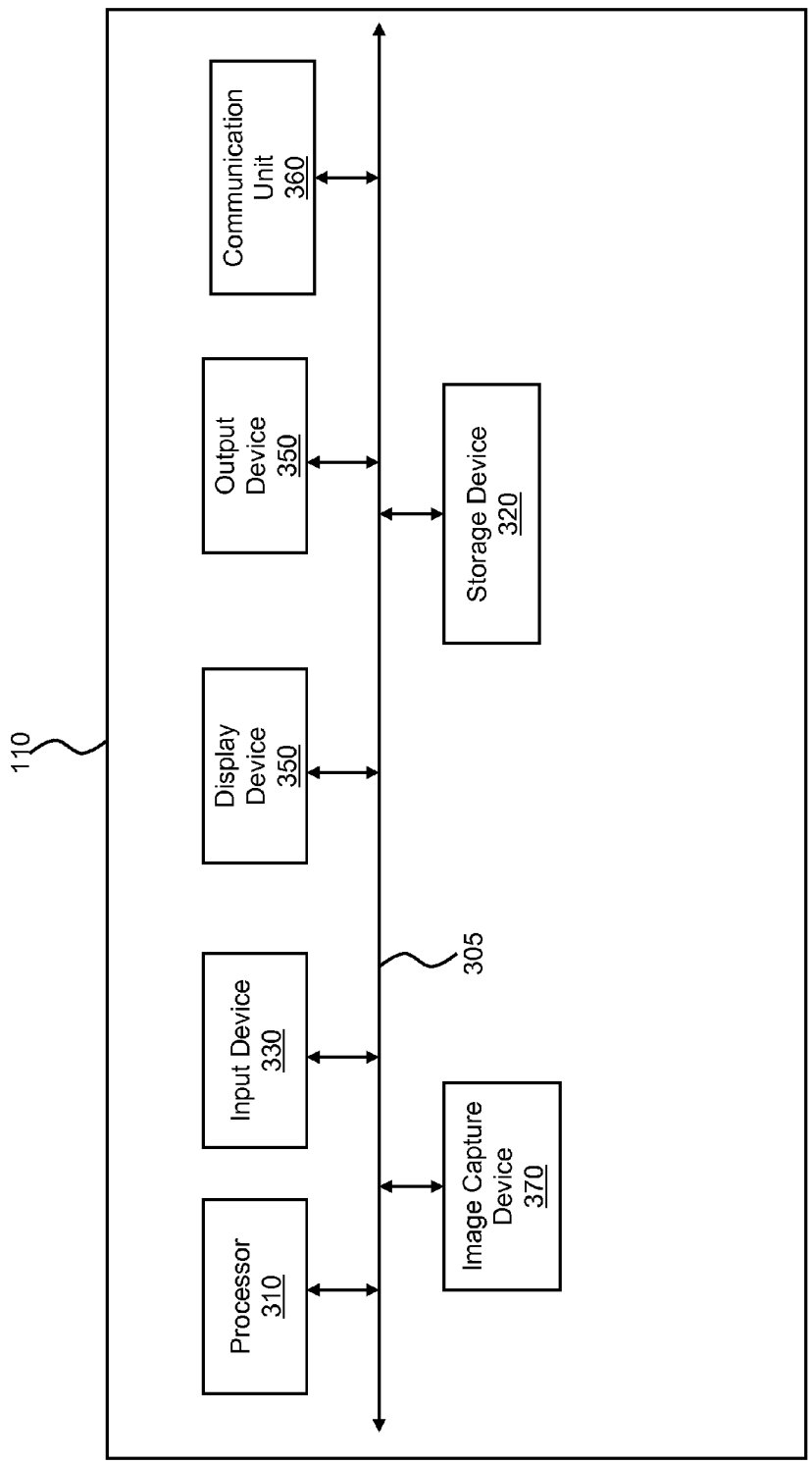
FIG. 3 is a block diagram of a client device in accordance with some embodiments.

FIG. 3 is a block diagram of one embodiment of a client device 110. In the embodiment shown by FIG. 3, the client device 110 includes a processor 310, a storage device 320, an input device 330, a display device 340, an output device 350, a communication unit 360 and an image capture device 370. The components of the client device 110 are coupled together via a bus 305. However, in different embodiments, the client device 110 may include different and/or additional components than those illustrated by FIG. 3.

The processor 310 processes data or instructions and may comprise various computing architectures. For example, the processor 310 may process data or instructions using a complex instruction set computer (CISC) architecture, a reduced instruction set computer (RISC) architecture, an architecture implementing a combination of instruction sets or any other suitable instruction set. Although FIG. 3 shows a single processor 310, in other embodiments, the client device 110 may include multiple processors. The processor 310 transmits, processes and/or retrieves data from the storage device 320, the input device 330, the display device 340, the output device 350, the communication unit 260 and/or the image capture device 370.

The storage device 320 stores data and/or instructions that, when executed by the processor 310, cause the processor 310 to perform one or more actions or to provide one or more types of functionality. The data and/or instructions included in the storage device 320 may comprise computer-readable code that, when executed by the processor 310, perform one or more of the methods described herein and/or provide at least a subset of the functionality described herein. The storage device 320 may comprise a dynamic random access memory (DRAM), a static random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art. The storage device 320 may be a persistent storage device, a non-persistent storage device or a combination of a persistent storage device and a non-persistent storage device in various embodiments. The storage device 320 is coupled to the processor 310, the input device 330, the display device 340, the output device 350, the communication unit 360 and/or the image capture device 370 via the bus 305.

In one embodiment, the storage device 320 includes data that, when executed by the processor 310, extracts a local device identifier and a remote device address from a graphical representation of a local device identifier 135 or extracts an accessory device identifier and a remote device address from a graphical representation of an accessory device identifier 215. For example, the storage device 320 includes instructions for a process extracting an alphanumeric string and additional data, such as a remote device address, from a QR code. The storage device 320 may also include an account identifier and instructions that, when executed by the processor 310, generate a message including an accessory device identifier or a local device identifier as well as a remote server address. The generated message may also include additional information for provisioning the local device 130 or pairing an accessory device 210 and the local device 130.

The input device 330 is any device configured to receive input and to communicate received input to the processor 310, to the storage device 320 or to another component of the client device 110. For example, the input device 330 comprises a cursor controller, a touch-sensitive display or a keyboard. In one embodiment, the input device 330 includes an alphanumeric input device, such as a keyboard, a key pad, representations of such created on a touch-sensitive display or another device adapted to communicate information and/or commands to the processor 310 or to the storage device 320. In another embodiment, the input device 330 comprises an input device for communicating positional data as well as data or commands to the processor 310 or to the storage device 320 such as a joystick, a mouse, a trackball, a stylus, a touch-sensitive display, directional keys or another suitable input device known in the art.

The display device 340 is a device that displays electronic images and/or data. For example, the display device 340 comprises an organic light emitting diode display (OLED), a liquid crystal display (LCD) or any other device such as a monitor. In one embodiment, the display device 340 includes a touch-sensitive transparent panel for receiving data or allowing other interaction with the images and/or data displayed by the display device 340.

The output device 350 comprises one or more devices that convey data or information to a user of the client device 110. For example, the output device 350 includes one or more speakers or headphones for presenting audio data to a user. As another example, the output device 350 includes one or more light emitting diodes (LEDs) or other light sources to provide visual data to a user. As another example, the output device 350 includes one or more devices for providing vibrational, or haptic, feedback to a user. The above are merely examples and the output device 350 may include one or more devices for providing auditory output, tactile output, visual output, any combination of the preceding or any other suitable form of output.

The communication unit 360 transmits data from the client device 110 to a network and/or to one or more of the remote server 120, the local device 130 and/or the accessory device 210. The communication unit 360 also receives data from the network and/or from one or more of the remote server 120, the local device 130 and/or the accessory device 210. In one embodiment, the communication unit 360 comprises one or more wireless transceivers transmitting and/or receiving data using one or more wireless communication protocols. Example wireless communication protocols include IEEE 802.11 a/b/g/n (WiFi), Global System for Mobile (GSM), Code Division Multiple Access (CDMA), Universal Mobile Telecommunications System (UMTS), General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax), BLUETOOTH® or another wireless communication protocol. In another embodiment, the communication unit 360 is a network adapter or another type of wired communication port for communicating with the network or with one or more of the remote server 120, the local device 130 and/or the accessory device 210 using a wired communication protocol, such as Universal Serial Bus (USB), Ethernet or another suitable wired communication protocol. In yet another embodiment, the communication unit 360 comprises a combination of one or more transceivers and one or more wired network adapters, or similar wired devices.

The image capture device 370 comprises sufficient optics and/or sensors for capturing image data. For example, the image capture device 370 is a camera or a video recorder. The image capture device 370 transmits captured image data to the processor 310, the storage device 320 and/or one or more additional components of the client device 110 via the bus 305.

Methods

Figure 4:
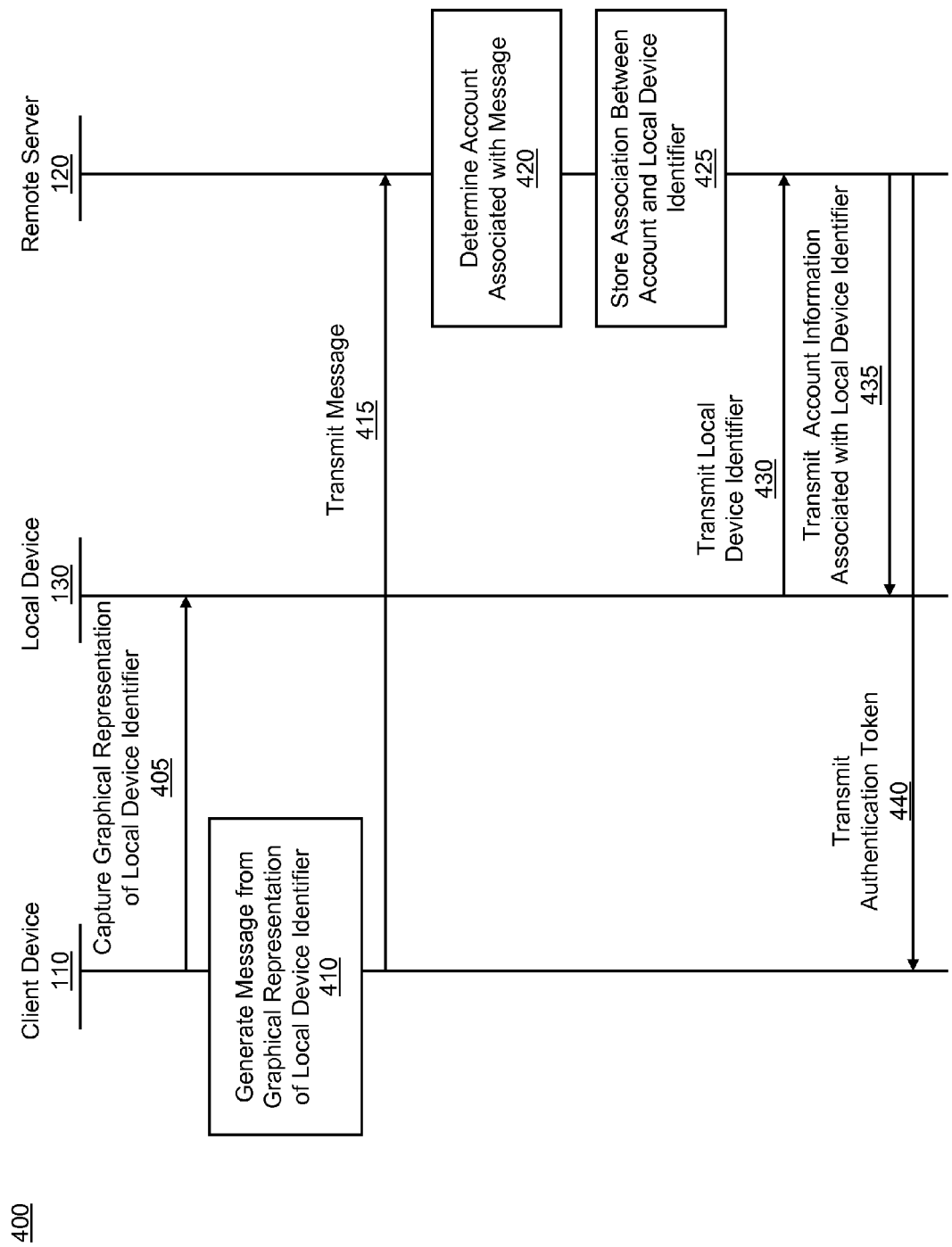
FIG. 4 is an event diagram of a method for provisioning a local device with an account in accordance with some embodiments.

FIG. 4 is an event diagram of one embodiment of a method 400 for provisioning a local device 130 with an account. Using an image capture device 370, the client device 110 captures 405 a graphical representation of a local identifier 125 from the local device 130. For example, the client device 110 captures 405 a picture of a QR code from the local device 130 using a camera or video recorder. The client device 110 generates 410 a message from the graphical representation of the local identifier 125. For example, a processor 310 included in the client device 110 executes instructions stored in a storage device 320 to identify the local device identifier and a remote server address from the captured graphical representation of the local device identifier 135 and to generate 410 a message including the local device identifier. In one embodiment, the message includes an account identifier for an account associated with the client device 110. In another embodiment, the message further includes a client device identifier. For example, the message includes an account identifier retrieved from the storage device 320 in the client device 110. In one embodiment, the message is a uniform resource indicator (URI) including the local device identifier and the address of the remote server obtained from the graphical representation of the local device identifier 135. The message may also include additional information obtained from the graphical representation of the local device identifier 135 for use in provisioning the local device 130 with the account. Examples of information obtained from the graphical representation of the local device identifier 135 include a type associated with the local device 130, metadata describing one or more attributes of the local device 130, commands for provisioning the local device 130 with the account or any other data for provisioning the local device 130 with the account.

The generated message is transmitted 415 from the client device 110 to a remote server 120 associated with the address of the remote server determined from the graphical representation of the device identifier 135. In one embodiment, the message is transmitted 415 via a network. Alternatively, the message is transmitted 415 using a direct connection between the client device 110 and the remote server 120.

Responsive to receiving the message, the remote server 120 determines 420 an account associated with the message. In one embodiment, the remote server 120 extracts the account identifier from the message. Alternatively, responsive to receiving the message, the remote server 120 transmits a request for account information to the client device 110 and receives an account identifier from the client device 110 responsive to the request for account information. For example, the remote server 120 transmits data for generating a web page to the client device 110, which processes the data to generate and display a web page for receiving account information that is transmitted from the client device 110 to the remote server 120.

The remote server 120 also identifies the local device identifier from the message and stores 425 an association between the local device identifier and the account associated with the message. For example, the remote server 120 stores 425 an account identifier and the local device identifier in a table or database to indicate the association between the local device identifier and the account identifier. However, in various embodiments, the remote server 120 stores 425 the local device identifier and an account identifier and data identifying an account in any manner suitable for indicating the association between the local device 130 and the account.

The local device 130 transmits 430 the local device identifier to the remote server 120 via a network or direct connection. Thus, the remote server 120 receives the local device identifier from the message from the client device 110, where the local device identifier was included after being determined from the graphical representation of the local device identifier 135, and also receives the local device identifier from the local device 130. Responsive to receiving the local device identifier from the local device 130, the remote server 120 determines the account associated with the local device identifier and transmits 435 information identifying the account associated with the local device identifier to the local device 130. In one embodiment, the local device 130 locally stores the account information, or a subset of the account information, to simplify subsequent interaction with the local device 130. Transmission 435 of the account information from the remote server 120 to the local device 130 allows subsequent connections, actions and messages to or from the local device 130 to be associated with the identified account.

In one embodiment, after transmitting 435 account information to the local device 130, the remote server 120 also transmits 440 an authentication token to the client device 110. The authentication token is stored in the storage device 320 of the client device 110 and allows the client device 110 to directly access the local device 130. While FIG. 4 shows the authentication token transmitted 440 from the remote server 120 to the client device 110, in other embodiments, the authentication token may be transmitted 440 from the remote server 120 to a plurality of client devices 110 associated with the account associated with the local device identifier. For example, the remote server 120 identifies a tablet computer, a laptop computer and a smartphone associated with the account, so the remote server 120 transmits the authentication token to the tablet computer, the laptop computer and the smartphone. This simplifies communication between various client devices 110 and the local device 130.

Figure 5:
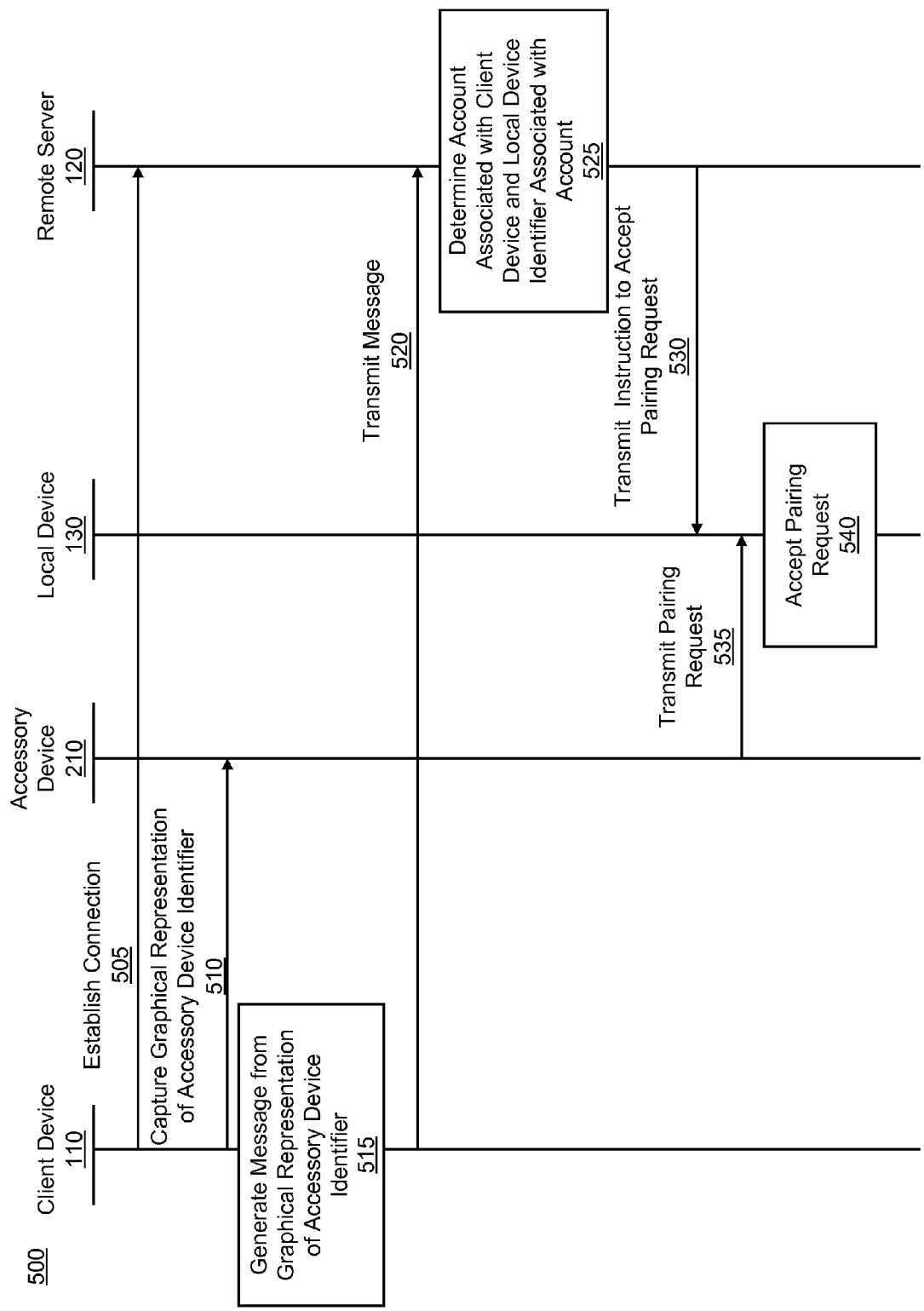
FIG. 5 is an event diagram of a method for pairing an accessory device with a local device in accordance with some embodiments.

FIG. 5 is an event diagram of a method 500 for pairing an accessory device 210 with a local device 130 in accordance with some embodiments. The client device 110 establishes 505 a connection with a remote server 120. For example, the client device 110 transmits account information to the remote server 120 to log into an account maintained by the remote server 120. After establishing 505 the connection with the remote server 120, the client devices captures 510 a graphical representation of an accessory device identifier 215 from the accessory device 210.

In one embodiment, the graphical representation of the accessory device identifier 205 is captured 510 by an image capture device 370 included in the client device 110. For example, the client device 110 captures 510 a picture of a QR code from the accessory device 210 using a camera or video recorder. The client device 110 generates 515 a message from the graphical representation of the accessory device identifier 215. In one embodiment, the message is a uniform resource indicator (URI) including the accessory device identifier. For example, a processor 310 included in the client device 110 executes instructions stored in a storage device 320 to identify the accessory device identifier and a remote server address from the captured graphical representation of the accessory device identifier 215 and to generate 515 a message including the accessory device identifier and the address of the remote server obtained from the graphical representation of the accessory device identifier 215.

The message may also include additional information obtained from the graphical representation of the accessory device identifier 215 for use in pairing the accessory device 210 with the local device 130. Examples of additional information obtained from the graphical representation of the accessory device identifier 215 include a type associated with the accessory device 210 or the local device 130, metadata describing one or more attributes of the local device 130 or the accessory device 210, commands for pairing the local device 130 with the accessory device 210 or any other data for pairing the local device 130 with the accessory device 210. In one embodiment, the message also includes an account identifier for the account associated with the client device 110. For example, the message includes an account identifier retrieved from the storage device 320 in the client device 110 or may include a client device identifier.

The generated message is transmitted 520 from the client device 110 to a remote server 120 associated with the remote server address. In one embodiment, the message is transmitted 520 via a network. Alternatively, the message is transmitted 520 through a direct connection between the client device 110 and the remote server 120.

Upon receiving the message, the remote server 120 determines 525 the account associated with the message. In one embodiment, the remote server 120 extracts the account identifier from the message and may extract additional information for pairing the accessory device 210 with the local device 130. Alternatively, the remote server 120 extracts data from the message and compares the extracted data with a subset of the data used to establish 505 the connection between the remote server 120 and the client device 110. In another embodiment, responsive to receiving the message, the remote server 120 transmits a request to confirm account information to the client device 110. The remote server 120 then receives a confirmation message from the client device 110 responsive to the request for account information. For example, the remote server 120 transmits data for generating a web page to the client device 110, which processes the data to generate and display a web page for receiving account information confirmation. Information received via the web page is then transmitted from the client device 110 to the remote server 120.

When determining 525 the account associated with the message, the remote server 120 also determines the local device 130 associated with the account. For example, when the account is identified, the remote server 120 identifies the local device identifier associated with the account. The remote server 120 then transmits 530 an instruction to accept a pairing request to the local device 130 associated with the local device identifier associated with the account. The instruction to accept the pairing request identifies the accessory device 210 from which a pairing request should be accepted using the corresponding accessory device identifier. In various embodiments, the instruction to accept the pairing request may include additional data for pairing the identified accessory device 210 with the local device 130. In one embodiment, the instruction to accept the pairing request is transmitted 530 via a network. Alternatively, the instruction to accept the pairing request is transmitted via a direct connection between the remote server 120 and the local device 130.

After the local device 130 receives the instruction to accept the pairing request, the accessory device 210 transmits 535 a pairing request to the local device 130 including the accessory device identifier. The local device accepts 540 the pairing request received from the accessory device 210 associated with the accessory device identifier included in the instruction to accept the pairing request. In one embodiment, the accessory device 210 periodically transmits pairing requests to the local device 130, and the local device 130 accepts 540 a pairing request from the accessory device 210 received after receiving the instruction to accept the pairing request. Alternatively, the accessory device 210 waits a predetermined time interval before transmitting 535 the pairing request to the local device 130 to allow time for the remote server 120 to transmit 530 the instruction to accept pairing request to the local device 130. In another embodiment, the remote server 120 also transmits an indicator to the accessory device 210 when the remote server 120 transmits 530 the instruction to accept the pairing request to the local device 130. The accessory device 210 transmits 535 the pairing request to the local device 130 responsive to receiving the indicator.

Figure 6:
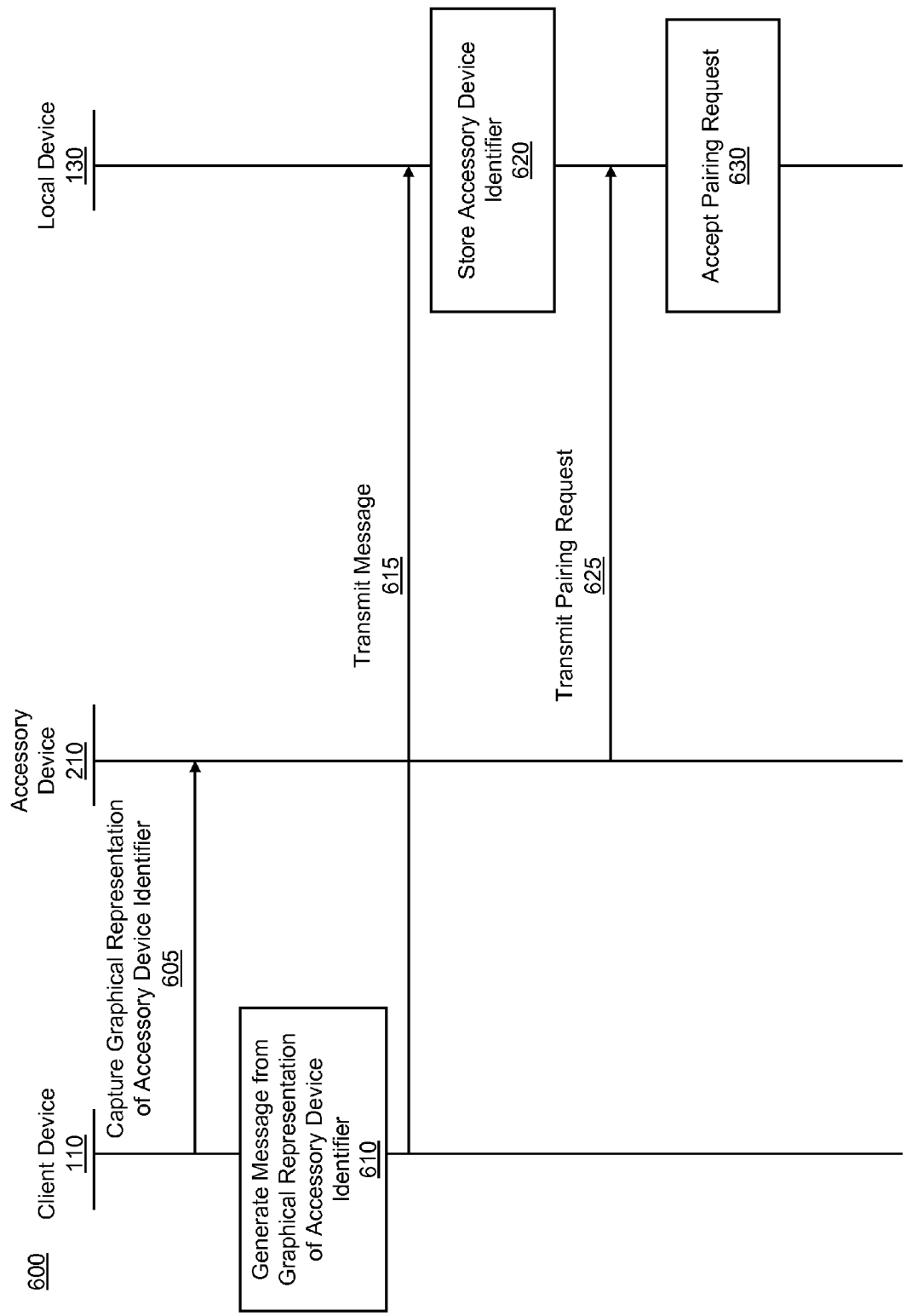
FIG. 6 is an event diagram of an alternative method for pairing an accessory device with a local device in accordance with some embodiments.

FIG. 6 is an event diagram of an alternative method 600 for pairing an accessory device 210 with a local device 130 in accordance with some embodiments. The client device 110 captures 605 a graphical representation of an accessory device identifier 215 from the accessory device.210. In one embodiment, the graphical representation of the accessory device identifier 215 is captured 605 using an image capture device 370 included in the client device 110. For example, the client device 110 captures 605 a picture of a QR code from the accessory device 210 using a camera or video recorder. The client device 110 then generates 610 a message from the graphical representation of the accessory device identifier 215. For example, a processor 310 included in the client device 110 executes instructions stored in a storage device 320 to identify the accessory device identifier and a remote server address from the captured graphical representation of the accessory device identifier 215 and to generate 610 a message, such as a uniform resource identifier (URI), including the accessory device identifier and the remote server address. In one embodiment, the message also includes an account identifier for an account associated with the client device 110 and the address of a remote server obtained from the graphical representation of the accessory device identifier 215. For example, the message includes an account identifier retrieved from the storage device 320 in the client device 110 as well as the accessory device identifier and the remote server address extracted from the graphical representation of the accessory device identifier 215.

The message may also include additional information obtained from the graphical representation of the accessory device identifier 215 for use in pairing the accessory device 210 with the local device 130. Examples of additional information obtained from the graphical representation of the accessory device identifier 215 include a type associated with the accessory device 210 or the local device 130, metadata describing one or more attributes of the local device 130 or the accessory device 210, commands for pairing the local device 130 with the accessory device 210 or any other data for pairing the local device 130 with the accessory device 210.

The generated message is transmitted 615 from the client device 110 to a local device 130. In one embodiment, the message is transmitted 615 via a network. Alternatively, the message is transmitted 615 using a direct connection between the client device 110 and the remote server 120. The local device 130 stores 620 the accessory device identifier included in the received message. In one embodiment, the local device 130 stores the accessory device identifier in a storage device included in, package with or coupled to, the local device 130, such as in a list of accessory devices paired with the local device 130 that is included in the storage device.

The accessory device 210 transmits 625 a pairing request to the local device 130 including the accessory device identifier. The local device accepts 630 the pairing request including the accessory device identifier to pair the accessory device 210 with the local device 130. In one embodiment, the accessory device 210 periodically transmits pairing requests to the local device 130, and the local device 130 accepts 630 a pairing request from the accessory device 210 received after storing the accessory device identifier included in the message. Alternatively, the accessory device 210 waits a predetermined time interval before transmitting 625 the pairing request to the local device 130 to allow time for the client device 110 to transmit 615 the message including the accessory device identifier to the local device 130. In another embodiment, the client device 110 also transmits an indicator to the accessory device 210 when the client device 110 transmits an instruction to transmit the pairing request to the accessory device 210 when transmitting 615 the message to the local device 130. The accessory device 210 transmits 625 the pairing request to the local device 130 responsive to receiving the indicator.

The above-described methods simplify provisioning of a local device 130 with an account or pairing an accessory device 210 with a local device 130 using a graphical representation of a local device identifier or a graphical representation of an accessory device identifier, respectively. Using an image capture device 370 included in a client device 110 to capture the graphical representation of the accessory device identifier or the graphical representation of the local device identifier simplifies identification of the local device 130 or the accessory device 210 for provisioning or pairing. This beneficially reduces the time to provision a local device 130 with an account or to pair an accessory device 210 with a local device 130 while reducing the likelihood of an error when identifying the local device 130 or the accessory device 210.

In the foregoing specification, specific embodiments have been described. However, one of ordinary skill in the art appreciates that various modifications and changes can be made without departing from the scope of the invention as set forth in the claims below. Accordingly, the specification and Figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for device provisioning comprising:
a local device associated with a local device identifier, the local device including a graphical representation of the local device identifier comprising an image generated by encoding the local device identifier and a remote server address;
a client device including an image capture device, the client device associated with an account, the image capture device configured to capture the graphical representation of the local device identifier from the local device and the client device configured to determine the local device identifier from the graphical representation of the local device identifier and to generate a message including the local device identifier; and
a remote server associated with the remote server address coupled to the local device and to the client device, the remote server including data describing the account associated with the client device and the remote server configured to receive the message from the client device and to associate the local device identifier from the message with the account.

2. The system of claim 1, wherein the remote server is further configured to receive the local device identifier from the local device and to transmit data describing the account associated with the client device to the local device responsive to receiving the local device identifier from the local device.

3. The system of claim 2, wherein the remote server is further configured to transmit an authentication token to the client device.

4. The system of claim 3, wherein the remote server is configured to transmit the authentication token to additional devices associated with the account.

5. The system of claim 1, wherein the graphical representation of the local device identifier comprises a quick response (QR) code.

6. The system of claim 1, wherein the graphical representation of the local device identifier comprises one or more of a type associated with the local device, metadata describing one or more attributes of the local device or a command for provisioning the local device with the account.

7. A system for device pairing comprising:
a local device associated with a local device identifier;
an accessory device associated with an accessory device identifier, the accessory device including a graphical representation of the accessory device identifier comprising an image generated by encoding the accessory device identifier;
a client device including an image capture device, the client device associated with an account, the image capture device configured to capture the graphical representation of the accessory device identifier from the accessory device and the client device configured to determine the accessory device identifier from the graphical representation of the accessory device identifier and to generate a message including the accessory device identifier; and
a remote server coupled to the local device, to the accessory device and to the client device, the remote server including data describing the account associated with the client device and the remote server configured to receive the message from the client device, to associate the accessory device identifier with the account and to transmit to the local device an instruction to accept a pairing request including the accessory device identifier received by the local device.

8. The system of claim 7, wherein:
the accessory device is further configured to transmit the pairing request to the local device; and
the local device is configured to accept the pairing request responsive to receiving the pairing request and receiving the instruction to accept the pairing request from the remote server.

9. The system of claim 7, wherein the graphical representation of the accessory device identifier comprises a quick response (QR) code.

10. The system of claim 7, wherein the graphical representation of the accessory device identifier comprises one or more of a type associated with the accessory device, a type associated with the local device, metadata describing one or more attributes of the accessory device, metadata describing one or more attributes of the local device or a command for provisioning the local device with the account.

11. A system for device pairing comprising:
an accessory device associated with an accessory device identifier, the accessory device including a graphical representation of the accessory device identifier comprising an image generated by encoding the accessory device identifier and a remote server address;
a client device including an image capture device, the client device associated with an account, the image capture device configured to capture the graphical representation of the accessory device identifier from the accessory device and the client device configured to determine the accessory device identifier from the graphical representation of the accessory device identifier and to generate a message including the accessory device identifier; and
a local device associated with a local device identifier, the local device coupled to the client device and configured to receive the message from the client device and to store the accessory device identifier included in the message.

12. The system of claim 11, wherein:
the accessory device is further configured to transmit a pairing request including the accessory device identifier to the local device; and
the local device is configured to accept the pairing request responsive to receiving the pairing request and to storing the accessory device identifier.

13. The system of claim 11, wherein the graphical representation of the accessory device identifier comprises a quick response (QR) code.

14. A method for device provisioning comprising:
capturing a graphical representation of a local device identifier from a local device, the graphical representation of the local device identifier generated from the local device identifier and a remote server address;
identifying the local device identifier and the remote server address from the graphical representation of the local device identifier;
generating a message including the local device identifier;
transmitting the message to a remote server associated with the remote server address for associating the local device identifier with an account.

15. The method of claim 14, wherein the message includes an account identifier identifying the account.

16. The method of claim 14, further comprising receiving an authentication token from the remote server, the authentication token associating the account with the local device identifier.

17. The method of claim 14, wherein the graphical representation of the local device identifier comprises a quick response (QR) code.

18. A method for pairing devices comprising:
capturing a graphical representation of an accessory device identifier from an accessory device, the graphical representation of the accessory device identifier generated from the accessory device identifier and a remote server address;
identifying the accessory device identifier and the remote server address from the graphical representation of the accessory device identifier;
generating a message including the accessory device identifier;
transmitting the message to a destination for associating the accessory device identifier with a local device.

19. The method of claim 18, wherein transmitting the message to the destination for associating the accessory device identifier with the local device comprises:
transmitting the message to a remote server associated with the remote server address, the remote server associating the accessory device identifier with the local device using an account including a local device identifier associated with the local device.

20. The method of claim 18, wherein transmitting the message to the destination for associating the accessory device identifier with the local device comprises:
transmitting the message to the local device, the local device storing the accessory device identifier to identify the accessory device.

21. The method of claim 18, wherein the graphical representation of the accessory device identifier comprises a quick response (QR) code.

* * * * *